US006450887B1

(12) United States Patent
Mir et al.

(10) Patent No.: US 6,450,887 B1
(45) Date of Patent: *Sep. 17, 2002

(54) METHODS AND APPARATUS FOR PARIMUTUEL HISTORICAL GAMING

(75) Inventors: Vernon B. Mir, Lutherville, MD (US); Robert Eric Jackson, Hot Springs, AR (US)

(73) Assignee: RaceTech L.L.C., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/411,609

(22) Filed: Oct. 1, 1999

Related U.S. Application Data

(60) Provisional application No. 60/106,161, filed on Oct. 29, 1998, now abandoned.

(51) Int. Cl.[7] .................................................. A63F 13/00

(52) U.S. Cl. ............................ 463/42; 463/25; 463/26; 463/28; 463/40; 463/6; 463/43; 463/27; 273/138 A; 273/86 B

(58) Field of Search ............................ 463/25, 26, 27, 463/28, 40, 42

(56) References Cited

U.S. PATENT DOCUMENTS 3,645,531 A * 2/1972 Wright .................. 273/138 A
5,275,400 A 1/1994 Weingardt et al.
5,411,258 A * 5/1995 Wilson et al. ................ 273/86
5,476,259 A * 12/1995 Weingardt .................. 463/28
5,779,547 A * 7/1998 Sorelle et al. ................ 463/28
5,830,068 A 11/1998 Brenner et al.
5,830,069 A 11/1998 Soltesz et al.
5,846,132 A 12/1998 Junkin
5,888,136 A 3/1999 Herbert
5,984,779 A 11/1999 Bridgeman et al.
6,152,822 A 11/2000 Herbert

* cited by examiner

*Primary Examiner*—Jessica Harrison
*Assistant Examiner*—Yveste G Cherubin
(74) *Attorney, Agent, or Firm*—Armstrong Teasdale LLP

(57) ABSTRACT

A gaming system is described which enables parimutuel wagering with instant payoffs on actual past events. The system, in one embodiment, includes a plurality of wager terminals coupled to a game server. The wagering terminals are multi-function terminals which enable a patron to enter a wager, provide high quality video/audio play-back, and can issue payments for winners. The game server is a computer system configured to manage the entire game system. For example, the server maintains databases, controls and accounts for the transactions with the wagering terminals, controls the flow of data from the video server to the terminals, collates pools from all sources and computes winnings, and provides detailed statistics for the disbursement of funds. The gaming system also includes a video server interface for providing high speed delivery of selected video clips from a historical database, and a tote system interface which is coupled to a standard racetrack totalisator system to allow the multi-function wagering terminal to operate as a standard self-service racetrack wagering terminal.

71 Claims, 7 Drawing Sheets

METHODS AND APPARATUS FOR PARIMUTUEL HISTORICAL GAMING

CROSS-REFERENCE TO RELATED APPLICATIONS

This application claims the benefit of U.S. Provisional Application No. 60/106,161, filed Oct. 29, 1998, now abandoned.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

The present invention is generally related to gaming devices, and more specifically, to a gaming device which enables parimutuel betting on races such as horse and dog races.

Parimutuel racetrack systems, known as "totalisators" or "tote systems", commonly offer pools such as the Pick-6 and the Twin-Trifecta, which are more difficult to win than the simpler win, place or show pools. An increased difficulty of winning results in a decreased frequency of payoff, and consequently, higher payoff. In the Pick-6, if no player exactly matches the winners of all 6 races, a portion of the pool may be paid as a consolation to lesser winners, and the remainder of the pool may be carried forward, progressively increasing from day to day until a player exactly matches the winners. In the Twin-Trifecta, the winners of one Trifecta (selecting the first three winners of a race in exact order) may be paid a portion of the pool. A second Trifecta is then offered to those winners only. Until one or more players win both pools consecutively, the remainder of the pool may be carried forward, progressively increasing. racing industry has seen a great increase in competition from lotteries and casinos. At least some patrons prefer a more immediate reward and higher frequency wagering than customarily offered at race tracks. For example, a typical racetrack offers one race every half hour. A casino having slot machines, however, offers a patron the opportunity to place a wager that can be won or lost every few seconds. In order to remain competitive, the racing industry is in need of a gaming system that satisfies the preferences of many different types of patrons.

It would be preferable, of course, to provide patrons with an opportunity to place wagers on a game which supports the racetrack sport. For example, some racetrack operators offer "simulcasting" which enables patrons to wager on races televised from other sites rather than watching a live race. Simulcasting allows racetrack owners to offer more variety to their patrons in addition to the local live racing, and also facilitates maintaining operations even when the local racing season is over. Although simulcasting does enhance patron loyalty, the number of wagers a patron can place is still limited, particularly in comparison to a slot machine.

Known video and mechanical racing games have fixed odds. Such fixed odds typically are required in order to comply with the applicable regulations of lotteries and casinos. However, for at least some patrons, fixed odds games typically are less enjoyable than parimutuel wagers. In addition, known racing games normally only simulate a real event, and tend to provide competition with, rather than support for, the actual underlying sport. Also, parimutuel gambling on racing is allowed in many more jurisdictions than casino games and even lotteries.

It would be desirable to provide a wagering mechanism which incorporates aspects of traditional racetrack wagers, e.g., parimutuel methods, progressively increasing carry-over pool for a large payoff, a more frequent consolation payoff to keep interest from waning, and possibly a series of related pools, yet which also can be played quickly, with a possible instant payoff. It also would be desirable to provide the racing industry with added value, or "shelf life", for reruns of live events.

BRIEF SUMMARY OF THE INVENTION

In one aspect, the present invention is a gaming system which enables parimutuel wagering with instant payoffs on actual past events. In parimutuel wagering, the players are playing against each other, and the "house" or the establishment conducting the game receives a commission on all wagers placed. Parimutuel wagering games are distinguishable from slot games or non-parimutuel wagering games where the players are playing against the "house" or establishment conducting the game. The gaming system, in one embodiment, includes a plurality of wager terminals coupled to a game server. The wager terminals are multi-function terminals which enable a patron to enter a wager, provide high quality video/audio play-back, and can issue payments for winners. The game server is a computer system configured to manage the entire game system. For example, the server maintains databases, controls and accounts for the transactions with the wagering terminals, controls the flow of data from a video server to the terminals, collates pools from all sources and computes winnings, and provides detailed statistics for the disbursement of funds.

The gaming system also includes a video server interface for providing high speed delivery of selected video clips from a historical database, and a tote system interface which is coupled to a standard racetrack totalisator system to allow the multi-function wagering terminal to operate as a standard self-service racetrack wagering terminal. Other interfaces to other types of wagering systems, such as a lottery, could also be provided.

Generally, and in operation, a player attempts to choose the winners of an unknown past event. Although the player does not know which event will be presented, some skill data may be shown on the video display, such as the relative past performance of competitors. After the player makes a selection of winners, the identity of the event is revealed, a video segment of the event is displayed, and the actual winners are presented. If the player correctly picked the winners, the player qualifies for an instant payoff determined in accordance with parimutuel methods. Winning multiple games in a session or selecting the maximum wager amount may qualify the player to win a larger payoff as well.

As explained above, one aspect of the present invention is to enable parimutuel wagering to offer instant payoffs. No known gaming device provides such wagering with instant payoffs. In the paradigm of live parimutuel wagering, a number of players place bets on the outcome of a single event. The players then wait for the results of the event, and then the winning players share the profits from their combined pool of wagers. Pools such as the Pick-6 and Twin-Trifecta add the elements of multi-tiered payoffs and a progressively increasing carry-over pool created by withholding a portion of the profits.

The present invention emphasizes the role of the progressive carry-over pools, so that all tiers of winning payoffs are made from progressive pools. Each player is presented with a unique event, so there is no pooling of other players' wagers on that event. Each wager forms a trivial pool of one, and either loses and is apportioned among the tiers of progressive pools, or wins and is awarded one of the progressive pools. Since the event is served up on demand from the historical library, not on a schedule, a winning payoff may be made instantly.

The above described gaming system can be utilized in connection with many different types of races such as horse and dog races. In addition, the system could be utilized in connection with other types of events. Importantly, the system supports and rewards the racing industry which produced the original wagering performances, which adds continuing "shelf life" and revenues to the original event.

DETAILED DESCRIPTION OF THE INVENTION

Set forth below is a detailed description of an exemplary embodiment of the gaming system. Many variations of such system are possible. For example, the present invention is not limited to being practiced in connection with the system architecture described below and many other system architectures could be utilized.

Figure 1:
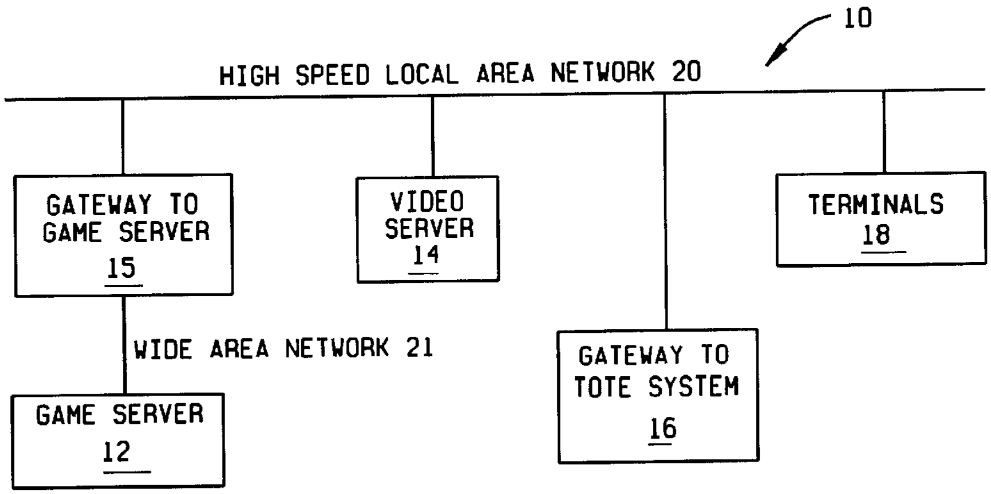
FIG. 1 is a block diagram of a game system.

Referring now to FIG. 1, which is a block diagram of a game system 10, such system 10 includes a game server 12, a video server 14, a gateway to game server 15, a gateway to tote system 16, and terminals 18, coupled by a high speed local area network 20 and a wide area network 21. Local area network 20, for example may include "100BaseT Ethernet" and "Gigabit Ethernet" components. Wide area network 21, for example, may be a frame relay network, or may include leased and dial-up telephone lines. Gateway to game server 15, for example, may be a "router" from Cisco Systems, Inc., San Jose, Calif. 95134. Game server 12, for example, may be composed of business file servers commercially available from Compaq Computer Corporation, Houston, Tex., 77269-2000, or from Dell Computer Corporation, Round Rock, Tex., 78682, or fault-tolerant systems commercially available from Stratus Computer, Inc., Marlboro, Mass., 01752. Video server 14 may, for example, be a server commercially available from Compaq Computer Corporation, or from N-Cube, Foster City, Calif., 94404-1184. An exemplary configuration of servers 12 and 14 is described below in more detail.

Components of system 10 may be distributed geographically over a number of sites. For example, game server 12 can be located at a central operations center, connected over wide area network 21 to several wagering sites. Each different wagering site must house a set of all components shown in FIG. 1 except game server 12. Due to the high communication band width required to transmit video images, video server 14 must be connected to the same high speed local area network 20 as are terminals 18. Transactions communicated over wide area network 21 are small relative to video images, and so require a smaller band width. Conversely, if there is only one wagering site, game server 12 could be connected directly to local area network 20, omitting wide area network 21 and gateway to game server 15.

Game server 12 manages system 10. Specifically, game server 12 maintains databases, controls and accounts for the transactions with terminals 18, controls the flow of data from video server 14 to terminals 18, manages the games by collating pools from all sources and computing the winnings, and provides detailed statistics for the disbursement of funds.

Game server 12 includes multiple databases including a game profile and control database, a liability database, a video access database, a skill database, and a network profile and control database. With respect to game profile and control database, such database contains data relating to which games are currently in use, and the current status of the games. The hierarchy of game definitions is as follows.

Game Rule Tables

Game Definition

Game Group

Game rules tables define attributes of games, including such fixed attributes as the number of selections in a bet, the number of winning positions to consider, and the method of matching winning positions to bet selections. Game rule tables also contain data relating to variations in the rules for each game which the operator may alter. These options include, for example, the percentages of sales which are allotted to the tiers of major and minor progressive pools and to commissions (take-outs), denomination of a basic wager, minimum payment levels, pattern of repeated wins needed to qualify for the major progressive pool, which subset of the video library is the subject of the wager, and which type of skill data to present to the player before his wager. An exemplary set of rules for one possible game, referred to herein as "Quick Trifecta", is set forth in Appendix A, and an exemplary set of rules for another possible game, referred to herein as "Thoroughbred Mania™", is set forth in Appendix B.

In the game definition database, data is stored to define each instance of a game upon which wagers can be placed. Attributes include, for example, the game rule table selection, current status such as "betting open", "open time", and "final close time", and amounts in the minor and major progressive pools. Players using terminals 18 and allowed to wager on this game compete against each other for the progressive pools. The group of terminals 18 involved in such a progressive pool may also be referred to herein as a "carrousel".

The game group database defines a group of carrousels in a geographic or demographic region in which a collection of games combine their major progressive pools into one combined progressive pool. Players using terminals 18 in such a group compete for the combined progressive pool. There may be a network of regional game systems collating major progressive pools into one master system, e.g., a master game server.

The liability database contains tables required for reporting money liabilities. The tables contain the information set forth below.

Commissions

Cooperating Industry Entitlements

Player Payment

Breakage

Minimum Payments

Carry-Over Accounts

Commissions are taxes and other fixed percentages of sales which are removed before determination of the progressive pool allotments. Cooperating industry entitlements are distributions to the racing industry or other such interest groups, such as racetracks, horse/dog owners, jockeys, and horseman's groups. Player payments are total amounts paid to winning players and a history of such payments. Breakage refers to the price round-off not returned to the pools, including separation of the regulated round-off and any higher actual round-off. Minimum payments refer to minimum payment levels including separation of the regulated minimum and any higher actual minimum. Carry-over accounts refer to amounts which are carried-over from one period to another for the progressive pools of each game.

The video access database is a catalog in game server 12 of the video image library stored in video server 14. The catalog is organized into "video groups", each sorted to meet the access requirements of specific games. For example, consider the Quick Trifecta game, described in Appendix A. When the player commits to a wager, then game server 12 will select at random a combination of three contestants, as yet unknown to the player. A race with those first three finishers is then selected as the object of the wager. After the player enters his selections, the identity of the race is revealed while the video image is downloaded and then played on the video display. A video group for the Quick Trifecta game would be sorted so that all videos with a selected combination of the first three finishers may be located, then one of them may be chosen.

The skill database is closely related to the video access database. When a game requires that the player exercise an element of skill, data such as past performance of the contestants will be presented on the video display before the player enters selections. Data may be presented as a bar chart, a pie chart, numerically, or in another understandable form. Associated with each video image is a list of several kinds of skill data, along with information on how each kind of data may be presented.

The network profile and control database contains tables which define the communication network. The network is a hierarchy of nodes, as set forth below.

Game Server

Communication Concentrators

Game Terminals

Administrative Terminals

Video Server

Tote System Interface

The communication concentrators are intermediate communication nodes for line multiplexing and protocol conversions. Examples of these communication nodes are Ethernet routers, switches, and hubs. Configuration of the game terminal population is under the direct control of the system operators from game server 12. All system control and reporting functions are performed using a network of administrative terminals. Game server 12 supplies information enabling video server 14 to route video clip segments directly to game terminals 18. When one of game terminals 18 switches modes to become a self-service racetrack terminal, it may be connected directly to the racetrack tote system through a separate network, or indirectly through gateway 16.

Game server 12 may also be utilized to upgrade and configure terminals 18. Game server 12 maintains a list of available configurations for terminals 18, and provides commands to modify and report the configuration tables. Server 12 also maintains the current version of the terminal software, and the ability to select different versions for subsequent download.

Game server 12 also gathers statistics during the game play cycle concerning the actual use of video clips. These statistics may be used for reporting of game usage, for control of online game play, for computation of payments, and for regulatory certification of the game terminal. Game usage statistics may be used to determine future variations in game control parameters such as locations, time-of-day, and types of events to offer. The statistics may also dynamically vary online game play patterns. For example, parameters may assure that the video selection process does not repeat a pattern of video clip displays within a controlled time period. Thus, a player would be unable to predict a selection pattern.

Video play statistics may be used to determine entitlements due to the racing (or other) industry which produced the original wagering performances. A variety of attributes of the video may be used, such as the racetrack, winning jockeys, and horse owners. In addition, play statistics can be used to certify that the payment rate to players conforms to any requirement.

Video server 14 provides high capacity storage of video images for system 10. Video server 14 may include, for example, a "Raid-5" disk array which combines high speed, reliability, and capacity. If dictated by high throughput requirements, video server 14 may be composed of several computer or disk storage modules.

In one embodiment of system 10, video server 14 would not contain any of the catalog data needed by the game server 12 to identify the video images. This separation of catalog data from video data has two benefits. First, little specialized software is required in the video server, since it can operate much like a file server. Second, video server 14 may be located separate from game server 12, in an area not under the direct supervision of the computer operation staff. Then security is enhanced in that illicit access to the video server reveals only videos, not a database revealing which videos are in actual use and correlating skill data with winning finishers. The process of creating the video clips and the corresponding catalogs would be accomplished in a separate computer system located in a secure facility.

In addition to playing the new game, game terminal 18 may be operated as a self service racetrack terminal, connected to the parimutuel live racing totalisator system. The player could then bet on any live programs provided at the particular location. Accordingly, a separate connection between terminals 18 and the totalisator system is provided, as well as a connection to a video feed displaying live races. Such access to the totalisator system is provided via a gateway 16, whose task is to translate messages from the protocol used by the gaming system network to the protocol used by the totalisator system network. Many different totalisator system networks are commercially available and use different protocols, and gateway 16 must be programmed in accordance with the protocol of the target totalisator system, as is known in the art.

Game terminals 18 are configured to be easy to operate and user friendly. Each game terminal 18 is substantially identical to other system game terminals 18, and therefore, the description of one game terminal 18 describes all other game terminals 18 of system 10. Components of terminals 18 are computer industry standard devices and are commercially available through computer component suppliers. Generally, and as described below in more detail, terminal 18 includes a user interface having a touch activated, color display. Other user interface devices include a cash acceptor, a printer, a document reader, sound card, a credit/debit card reader, and possibly a coin dispenser. The cash acceptor includes a coin acceptor and/or a bill acceptor.

Figure 2:
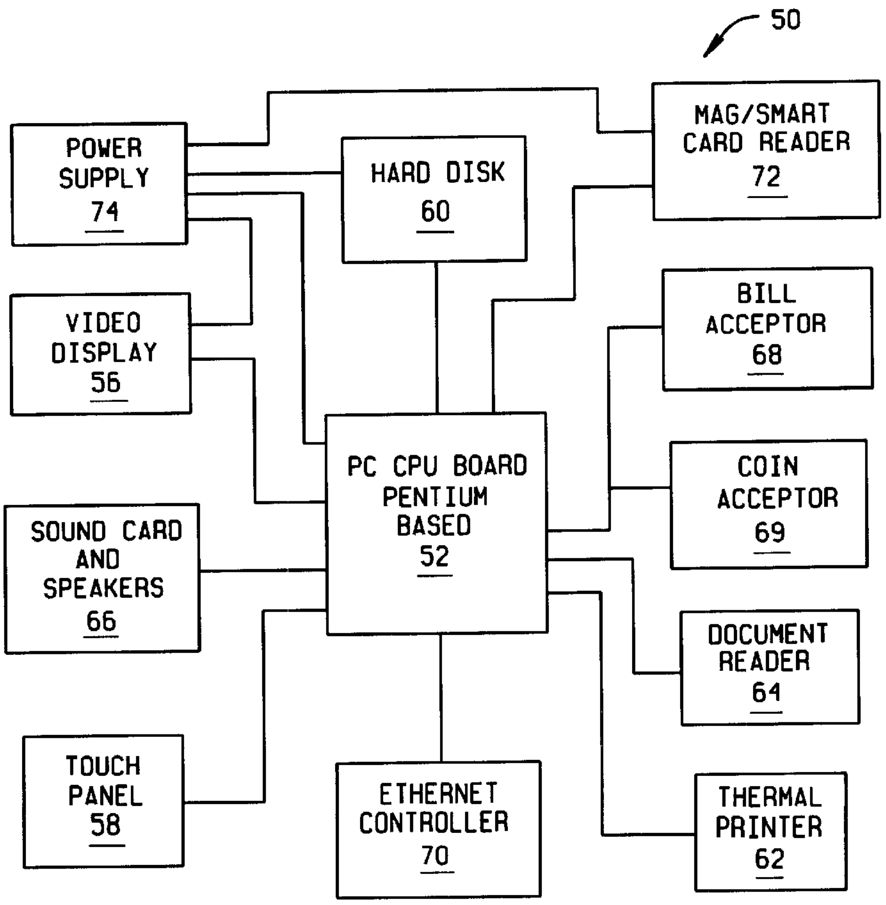
FIG. 2 is a block diagram of a game terminal.

Referring now to FIG. 2, which is a block diagram of an exemplary game terminal 50, terminal 50 includes a PC motherboard 52, which may incorporate a graphics controller, a video display with controller 56, touch panel and controller 58, hard disk 60, thermal printer 62, document reader 64, sound card and speakers 66, bill acceptor 68, coin acceptor 69, network interface controller 70, magnetic/smart card reader 72, and power supply 74. Each of the components illustrated in FIG. 2 is well known in the art and commercially available.

Video display 56, in one embodiment, is a 19-inch video monitor which displays crisp, bright, high resolution graphics with no flicker. Various menus, which are described below in more detail, are provided to the patron via display 56. In addition, video clips of events pertinent to the various wagers that may be made also can be shown on display 56. Touch panel 58 is "married" to video display 56 and provides an effective manner for providing the player with immediate acknowledgment that the input has been accepted by changing the color or blinking a target on display 56. Touch panel 58 and video display 56 are coupled with sound system 66 to also provide an audible feedback when the player touches the target.

Bill 68 and/or coin 69 acceptor(s) allows the player to establish a credit balance prior to selecting an event and inputting a wager. Using a credit from an existing wager or a voucher (through reader 64) are alternate methods for establishing a balance. Document reader 64 accepts a credit voucher or winning ticket for establishing a balance against which a player places a wager. The reader described in U.S. Pat. No. 5,173,596 is customer friendly and highly reliable, and may be used as reader 64.

Thermal printer 62 provides the player with an easy-to-read receipt of winnings or credits. The receipt contains human readable information such as time and place of issue, value of credit or winnings, and a control number. The control number is also printed in bar code form that can be automatically read by reader 64.

Magnetic/smart card reader 72 accepts and reads magnetic and smart cards that have been issued as bank account cards, debit cards, and for player tracking or similar functions. Game terminal 50 therefore has significant flexibility for transfer of monies, identifying players, award of frequent-player points, or similar functions.

Ethernet controller 70 provides a high-speed data channel for the video input from video server 14, which provides an uninterrupted video stream of the event selected by the player. Controller 70 also provides the data channel with transactions with game server 12.

Motherboard 52, in one embodiment, is an ATX platform for the Pentium processor, which provides the performance needed for the high-speed user interfaces. Board 52 also provides, along with the software drivers, the control of the player input/output devices such as receipt printer 62, optical document reader 64, bill acceptor 68, and coin acceptor 69. Board 52, as is known in the art, includes a microprocessor, memory, disk drive interfaces, serial/parallel ports, as well as keyboard and mouse connections.

Hard disk 60 is coupled to board 52 and stores the operating system, bootstrap, and drivers for the various devices such as reader 64 and printer 62. Power supply 74 converts the AC line voltage into the regulated direct current voltages required by the components of terminal 50.

Figure 3A:
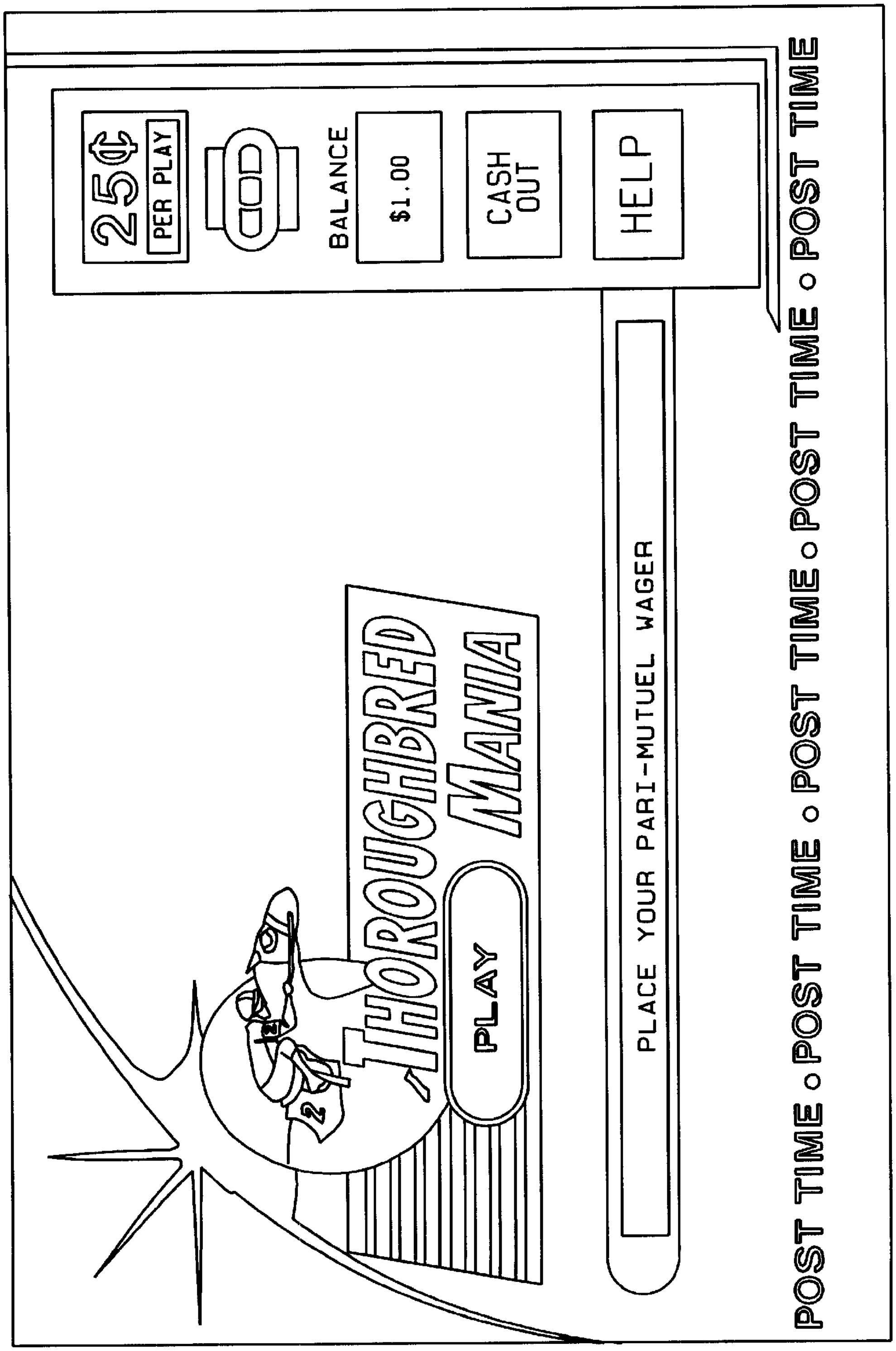
FIG. 3*a* is an exemplary game selection menu screen.

FIGS. 3*a–e* are exemplary screens displayed to a player by display 56. More specifically, FIG. 3*a* is a game selection menu screen. A player may select, for example, to play one of the instant racing games "Thoroughbred Mania™" or "Thundering Hounds™", or "Live Racing" (latter two choices not shown), or to be paid the credit balance ("Cash Out") currently displayed by terminal 50. Whenever the player inputs money into terminal 50, e.g., via bill acceptor 68, coin acceptor 69, or reader 72, the balance amount displayed is adjusted to reflect the current balance.

Figure 3B:
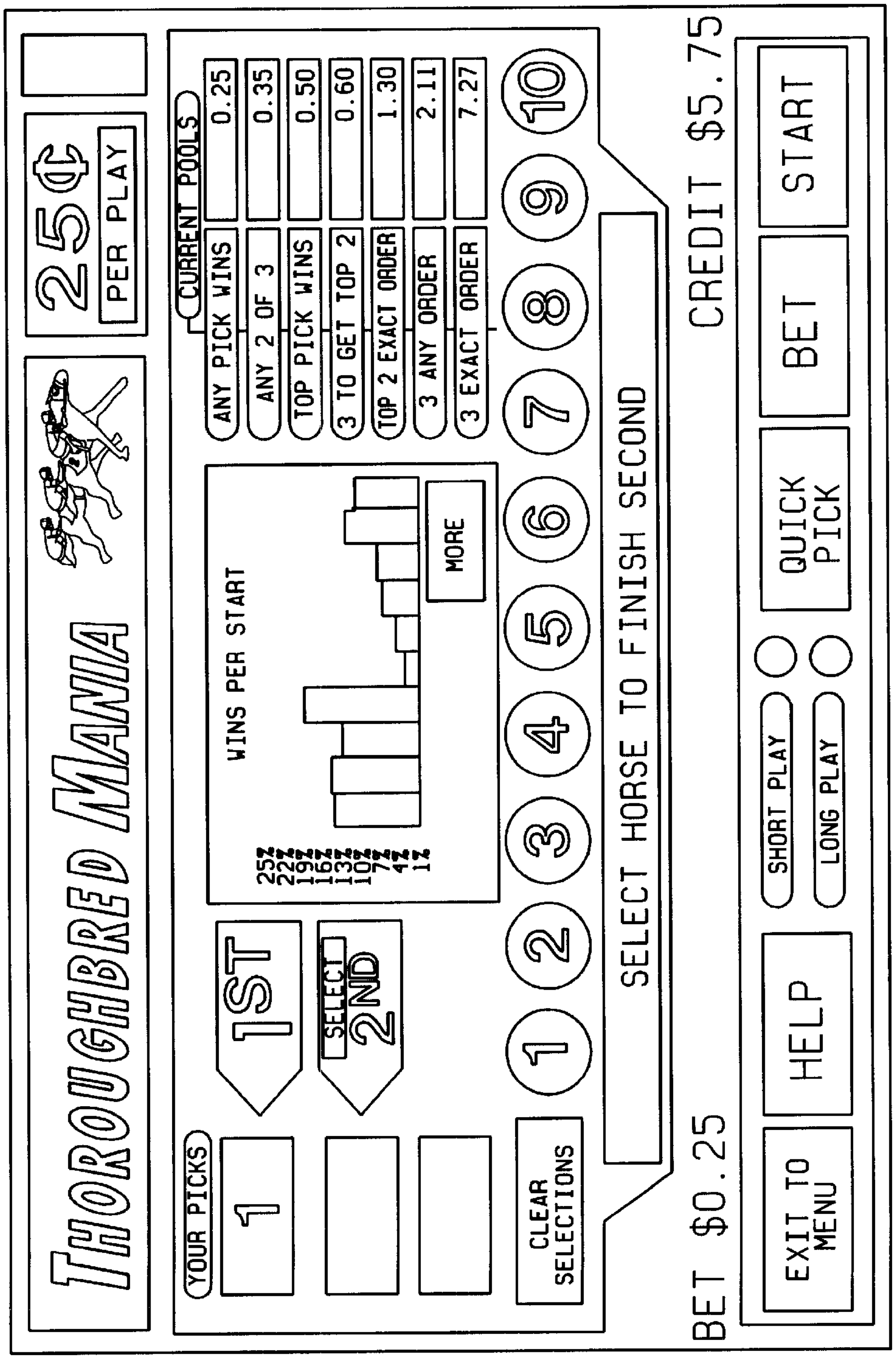
FIG. 3*b* is an exemplary winner selection screen during selection.

FIG. 3*b* is a winner selection screen, depicted after the player has pressed the "Bet" button to commit a 25 cent wager, and has selected a horse to finish first. The "Current Pools" show the constantly changing amounts for the various ways that this bet could win. This typically is the first screen shown to a player upon selecting one of the instant racing games. The player is provided with historical racing data, e.g., past-performance racing data in the form of a bar graph showing the relative merits of the horses. While selecting horses to finish first, second, and third, additional prompts may be displayed depending upon the type of game, e.g, Quick Trifecta. The player may have the system select the remaining winners by touching the "Quick Pick" button. If the player does not like his or the system pick, the selections can be deleted by touching the "Clear Selections" button.

Figure 3C:
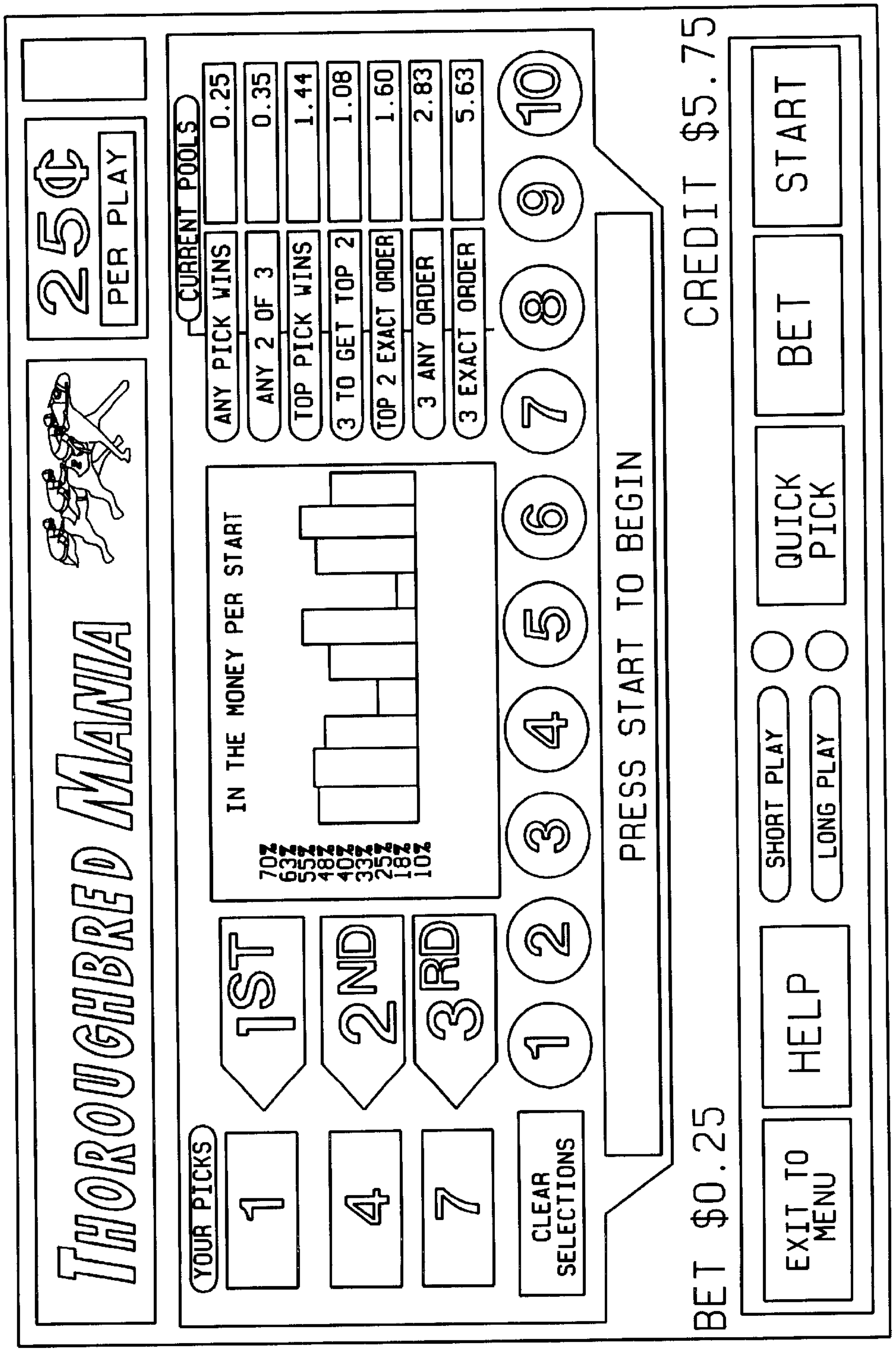
FIG. 3*c* is an exemplary winner selection screen with selections complete.
Figure 3D:
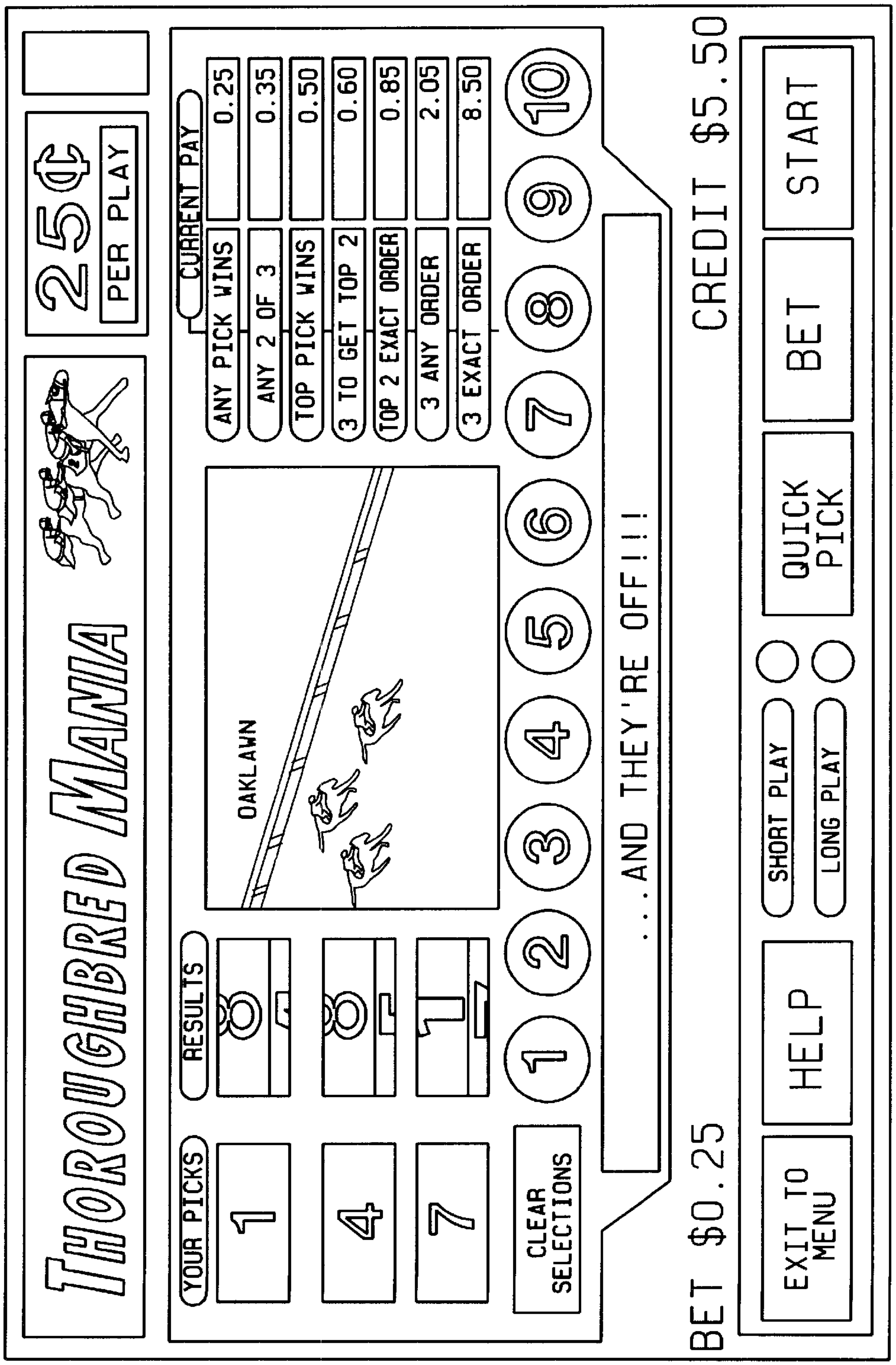
FIG. 3*d* is an exemplary video play screen

FIG. 3*c* is the winner selection screen, depicted after the player has selected all three horses. After making the required selections, the player then starts the race by touching the "Start Race" button. FIG. 3*d* is the video play screen, depicted while watching the race. The results are not yet revealed, and horse numbers are rolling past their display boxes. The "Current Pools" display is frozen showing the exact amounts that could be won by this bet.

Figure 3E:
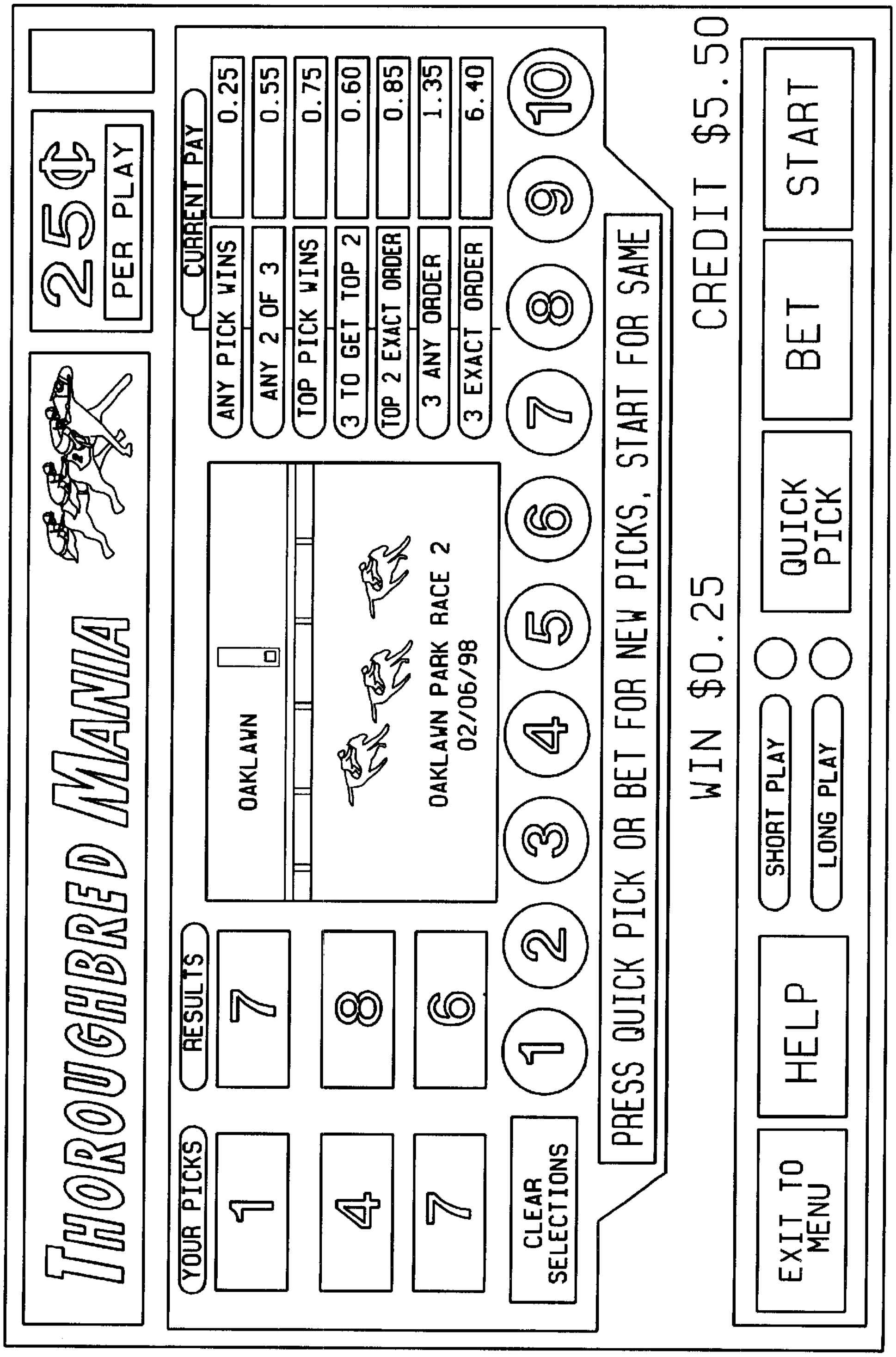
FIG. 3*e* is an exemplary result screen after a play.

FIG. 3*e* is the result screen after a play. The specific race video has finished playing, and the actual race results are shown. The players picks are displayed adjacent to the race results so that the player can quickly evaluate whether he won. The display also provides an indication as to whether the player won, e.g., "Any Pick Wins" is highlighted since the player's third selection won the race, and the amount won is shown below as "Win $0.25". Simply showing "Game Over" would indicate a loss. The player may also select to play again with new selections by pressing "Bet" or "Quick Pick" (back to FIGS. 3*b–c*), or to play again with the same selections by pressing "Start" (back to FIG. 3*d*). The player may also return to the "Main Menu" (e.g., FIG. 3*a*). The updated credit balance also is displayed to the player, e.g.as "Credit $5.50".

With respect to FIGS. 3*a–e,* the following describes a typical interaction between terminal 50 and a player. Specifically, a player activates terminal 50 by inserting currency or otherwise establishing credit. The player chooses the type of game, if more than one is offered. The player selects "Bet" or "Quick Pick" to commit a wager.

Terminal 50 displays the available selections and may also display skill data to assist the player.

The player makes a selection using the numbered buttons or "Quick Pick", then selects "Start". Terminal 50 reveals the identity of the event and plays a video segment, and finally displays the actual winning results. The amount of winnings, if any, and the new credit balance are displayed. The player either commences betting again, or chooses to stop playing and redeem any remaining credit balance. Rather than adding winnings to the credit balance, terminal 50 could issue coins immediately to the player. When the player terminates playing and redeems his credit balance, he may receive a printed credit voucher, or possibly coins.

The invention has been described in an on demand mode where revealing the identity of the historical gaming event and the playing of a video segment of the event is performed immediately after the player makes his selections. However, the gaming system can be configured to use a periodic mode where the historical gaming event is identified and the video played periodically. For example every 30 seconds, every minute, every 5 minutes, or every 10 minutes. In the periodic mode, the players must make their selections before the end of a period.

Figure 4:
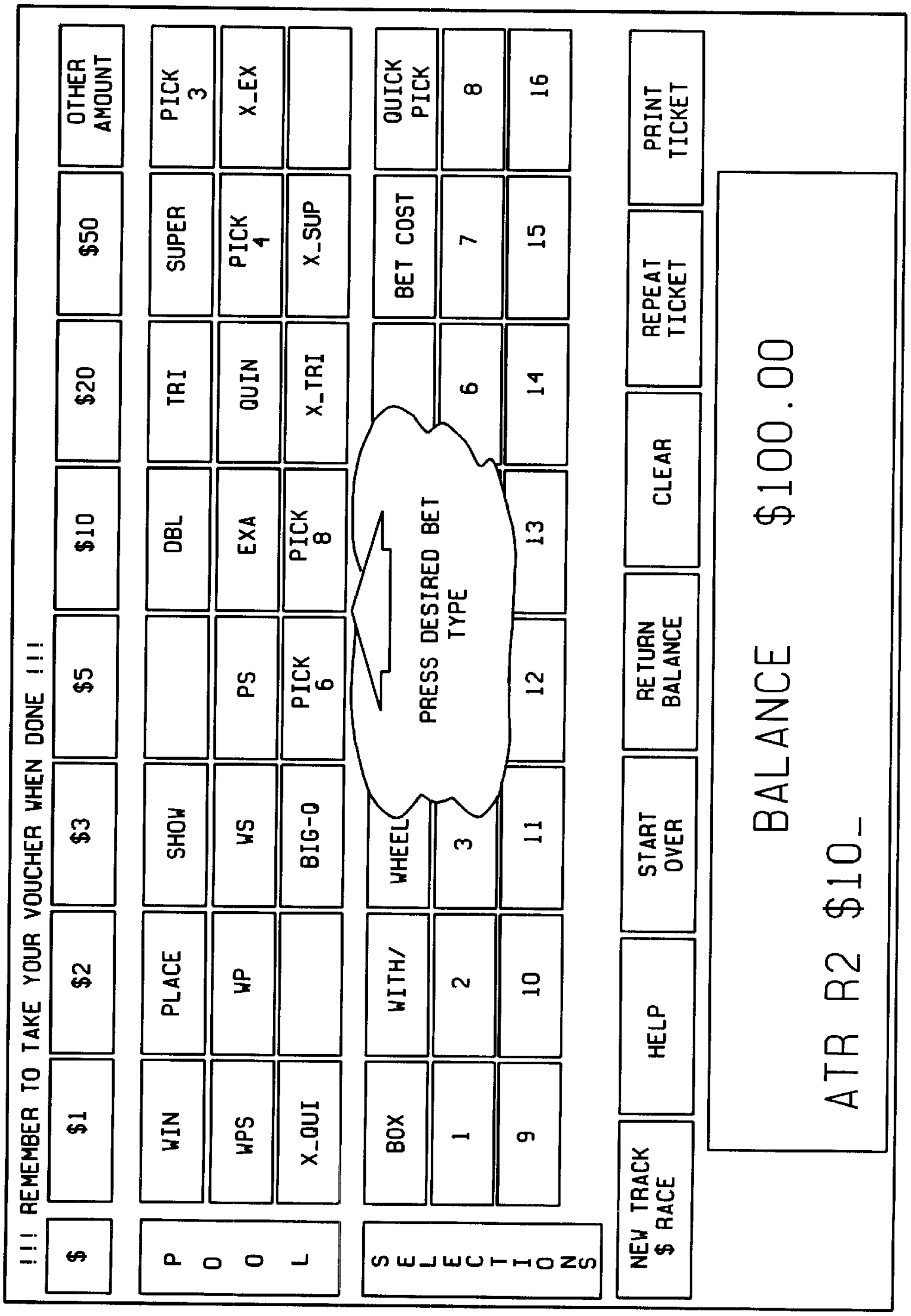
FIG. 4 is an exemplary screen for a self-service racetrack wagering mode.

FIG. 4 is an exemplary screen from the self-service racetrack wagering mode emulating an AmTote V3000 terminal, which is well known in the art. This mode is entered into if"Live Racing" is selected at the screen shown in FIG. 3*a*. With respect to the screen shown in FIG. 4, a player selects a particular track and race number on which the player wants to make a wager. After making these selections, the player can then select the particular game and horses to be played, along with a wager amount.

Game server 12 and terminal 50 may communicate often during the operation of the game terminal. The following describes the various types of transactions between game server 12 and terminal 50. These transaction descriptions are exemplary, and some transactions may not be necessary or more transactions may be required, depending on whether certain logic functions are performed by terminal 50 or game server 12.

Specifically, a currency/credit entry transaction occurs when a player enters a coin or other currency into terminal 50, or otherwise adds to the credit available for wagering. The message sent to game server 12 contains the amount and type of currency or credit.

A select game/mode transaction occurs when the player selects a type of game from a list of available game types, or selects a different mode for terminal 50, such as self-service live-race wagering.

An "Enter-bet" transaction occurs when the player presses "Bet" or "Quick Pick". The past-performance chart is returned from game server 12 to terminal 50 for display on video display 56.

A "More-skill" transaction occurs when the player presses "More" while viewing a past-performance chart, and another chart is returned from game server 12 to terminal 50 for display on the video display. Within this one game play, the player is limited to fewer than the total number of available charts.

A "Start" transaction initiates the transfer of the amount wagered, and the runners selected to game server 12. Server 12 responds to terminal 50 with data relating to which video to play, the winner/loser status, and the amount won if any. The response may also contain information for terminal 50 to "freeze and alarm" in the case of a major progressive winner, or any other special payoff situations. After this transaction between game server 12 and terminal 50, the actual video clip is transferred from video server 14 to terminal 50. The winner/loser status and amount won are revealed on video display 56 at the end of the video clip play back.

A call attendant transaction, activated by pressing "Help", then "Call Attendant" requests that server 12 send a message to an administrative terminal calling an attendant for player assistance.

A terminal reset transaction causes terminal 50 to reset/reboot. A terminal download transaction causes terminal 50 to enter a download state, in which it will be downloaded with the most recent version of the terminal software. A terminal statistics transaction causes terminal 50 to send its local statistics to server 12.

On-line transaction processing requires a fully fault-tolerant, continuously available system, which preserves data integrity, incorporates online upgrades and online service, and does not degrade application performance in the event of a failure. Recovery from single component failure should be accomplished with little or no system downtime, and should be transparent to the transaction application. This continuous availability can be accomplished in system 10 with a hardware-based fault tolerant system, or with a combined hardware/software-based fault tolerant system.

Recovery from some multiple component failures must rely on software transaction processing services regardless of the hardware configuration. All database components updated by a single transaction must be, in effect, updated together. Every transaction which a user sees completed must be recoverable in the database. To accomplish this, the transaction must be recorded on at least two non-volatile media or two computer modules before the user acknowledgment is transmitted to terminal 50. To ensure that all of the database components updated by a single transaction are completed together, the transaction services can roll back the database to the condition it was in before any interrupted transaction.

A hardware-based fault tolerant system, such as systems commercially available from Stratus Computer, Inc., Marlboro, Mass., 01752, includes a single computer system with each of its major system components physically duplicated and operating in lockstep for full duplex operation. Self-checking is resident on each major circuit board to detect and immediately isolate failures. Any single component failure is immediately detected by the system and the component is isolated, allowing processing to continue on the partnered component with no performance degradation. Failed components may be replaced on-line and will resume duplex operations with no disruption to the application.

A hardware/software fault tolerant system, in one embodiment, follows the master-secondary model, with two identical servers functioning as a single duplexed system under software control. This method may be chosen when business file servers, such as those commercially available from Compaq Computer Corporation, Houston, Tex., 77070-2698, are used to construct game server 12. One server operates as the master, and the second server operates as a hot backup, or secondary system. A third identical server functions as a cold spare system. To maintain data integrity, each individual server has fully duplexed disks, with two copies of the transaction data on the master and two on the secondary. The servers are connected with redundant network connections. If the master server fails, the secondary server becomes the master transaction processor. A failure in the secondary computer would be completely transparent to the wagering network since the system would continue to operate in simplex mode. In case of failure of the master or the secondary server, the spare server would be brought on-line to become the new secondary server and resume duplex operation. Single system failures would cause no lost transactions. A failed computer would assume the role of cold spare and may be maintained and upgraded off-line with no disruption to the on-line system.

Transaction processing software suitable for game server 12 is commercially available from vendors of totalisator systems and lotteries. General purpose transaction processing software is also commercially available from many vendors, such as the Oracle Application Server commercially available from Oracle Corporation, Redwood Shores, Calif., 94065, and the Transaction Processing Facility commercially available from Stratus Computer, Inc., Marlboro Mass., 01752, for use on their fault-tolerant computers.

The above described gaming system can be utilized in connection with many different types of races such as horse and dog races. In addition, the system could be utilized in connection with other types of events. Importantly, the system supports and rewards the racing industry which produced the original wagering performances, which adds continuing "shelf life" and revenues for the original event.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

Appendix A

Exemplary Game Protocol for Quick Trifecta (QT)

© Copyright 1999 RaceTech L.L.C.

Summary: The QT bet requires selection of the first three finishers, in their exact order, for a single contest selected from the historical library. The contest from the historical library is selected at random before the player enters any selection. After the selections are registered, the identity of the contest is revealed, a video segment of the contest finish is shown, and the actual official results are displayed. If a player matches the first three finishers in order, he wins the Trifecta QT pool. If he matches only the first finisher, he wins the Win QT pool. Any winnings may be collected instantly. If a player wins the Trifecta QT three times in a row, then he wins the Carry Over QT pool.

Wager Amount: Only one dollar ($1) wagers are accepted for the QT.

Pool Split: After commissions have been deducted from the wager, the remaining amount is apportioned among four separate pools which have been carried over from previous contests played by all players: the Carry Over QT pool (A%), the Trifecta QT pool (B%), the Win QT pool (C%), and the Bonus/Minimum QT pool (D%).

A. The Carry Over QT pool has a minimum guaranteed amount of $AA,AAA. When the increasing Carry Over QT pool is won, it reverts to this guaranteed amount for the next winner.

B. The Trifecta QT pool has a minimum guaranteed amount of $BBB. When the increasing Trifecta QT pool is won, it reverts to this guaranteed amount for the next winner.

C. The Win QT pool has a minimum guaranteed amount of $C. When the increasing Win QT pool is won, it reverts to this guaranteed amount for the next winner.

D. The Bonus/Minimum QT pool is accumulated from the designated percentage of wagers and from the pricing round-off, as described below.

Trifecta QT Winner: If a player correctly selects the first three finishers in exact order, he wins the entire Trifecta QT pool, less pricing round-off. If two players win within a short time, the first winner is paid the current Trifecta QT pool, and the second is paid the new Trifecta QT pool, which begins with the guaranteed amount.

Carry Over QT Winner: If a player wins the Trifecta QT pool three times in a row, then he wins the entire Carry Over QT pool, less pricing round-off, instead of the Trifecta QT pool. If two players win the Carry Over QT pool within a short time, the first winner is paid the current Carry Over QT pool, less pricing round-off, and the second is paid the new Carry Over QT pool, which begins with the guaranteed amount.

Win QT Winner: If a player correctly selects the first finisher for first, but not the first three, he wins the entire Win QT pool, less pricing round-off. If two players win within a short time, the first winner is paid the current Win QT pool, less pricing round-off, and the second is paid the new Win QT pool, which begins with the guaranteed amount.

Dead Heat: If there is a dead heat for first, second, or third, the player has a chance to win for each winning combination.

Coupled Entries, Mutuel Fields: In a contest involving coupled entries and mutuel fields, only the highest placed member of the coupling is included in the order of finish. For example, if the order of finish is 1/1A/2/3, then the QT uses 1/2/3.

Bonus/Minimum QT Pool: To cover the cases when one of the guaranteed minimum amounts is paid, a Bonus/Minimum QT pool is accumulated from the designated percent of wagers, and from the pricing round-off. Each time one of the guaranteed minimum amounts is paid in excess of the actual amount available, the shortfall is deducted from the Bonus/Minimum QT pool. Whenever the Bonus/Minimum QT pool exceeds a designated maximum amount, the Win QT guaranteed amount is quadrupled.

Mandatory Distribution: Should the QT pool be designated for mandatory distribution on a specified date and performance, then after a scheduled time of day, the next Trifecta QT winner is paid the sum of the actual amount in the Win, Trifecta and Carry Over QT pools, plus any positive amount in the Bonus/Minimum QT pool, and no more bets will be accepted.

Appendix B

Exemplary Game Protocol for Thoroughbred Mania™

© Copyright 1999 RaceTech L.L.C.

Summary: The Thoroughbred Mania game requires selection of the first three finishers for a single race selected from the historical library. The race from the historical library is selected at random before the player enters any selection. The player may examine one or more charts showing the relative merits of the horses as they actually were on the day of the race. After the selections are registered, the identity of the race is revealed, a video segment of the race finish is shown, and the actual official results are displayed. A player wins by matching some or all of the first three finishers in one of seven different ways. Any winnings may be collected instantly. A player must risk a second unit bet in the wager to qualify for the highest value pool.

Wager Amount: At machines marked "$1 Per Play" one dollar ($1) unit bets are accepted. At machines marked "25¢

Per Play" twenty-five cent ($0.25) unit bets are accepted. The player may enter only one or two unit bets per play.

Pool Split: After commissions have been deducted from the wager, the remaining amount is apportioned among several separate pools which have been carried over from previous races played by all players. The remaining amount of the first unit bet is apportioned among seven pools, including one pool for each of six ways to win, plus the Minimum Fund pool. The remaining amount of the second unit bet is apportioned between the highest value (3 Exact Order) pool and the. Minimum Fund pool. The percentages for apportioning the wager among commissions and the various pools will be posted.

Ways to Win: Wagers may qualify to win in up to seven different ways, including:

A. 3 Exact Order: The player's selections correctly match the first three finishers in exact order, only for players who risked two unit bets in the wager.

B. 3 Any Order: The player's selections correctly match the first three finishers in any order.

C. Top 2 Exact Order: The player's top two selections correctly match the first two finishers in exact order.

D. 3 to get Top 2: Any of the player's three selections correctly match the first two finishers in any order.

E. Top Pick Wins: The player's top selection correctly matches the first (winning) finisher.

F. Any 2 of 3: The player's selections correctly match any two of the three finishers in any order.

G. Any Pick Wins: Any one of the player's selections correctly matches the first (winning) finisher.

Payment Calculation: The winning price is the entire amount in the pool for which the wager qualifies, less the price round-off. When the wager qualifies to win more than one pool, the largest single amount is paid. Each pool has a minimum guaranteed amount, which will be posted. If two players qualify to win the same pool within a short time, the first winner is paid the current pool and the second is paid the new pool, which begins with the minimum guaranteed amount.

Dead Heat: If there is a dead heat for first, second, or third, the player has a chance to win for each winning combination.

Coupled Entries, Mutuel Fields: In a race involving coupled entries and mutuel fields, only the highest placed member of the coupling is included in the order of finish. For example, if the order of finish is 1/1A/2/3, then the Thoroughbred Mania game uses 1/2/3.

Minimum Fund pool: To cover the cases when one of the minimum guaranteed amounts is paid, the Minimum Fund pool is accumulated from a designated percent of wagers.

A. Each time the 3 Exact Order or the 3 Any Order pool is paid out, it is seeded to its minimum guaranteed amount from the Minimum Fund pool.

B. For the other five pools, each time its minimum guaranteed amount is paid in excess of the actual amount available in the pool, the shortfall is deducted from the Minimum Fund pool.

C. Whenever the Minimum Fund pool exceeds a designated maximum amount, a designated portion of the Minimum Fund is added to the 3 Exact Order pool as a bonus.

Mandatory Distribution: Should the Thoroughbred Mania game be designated for mandatory distribution on a specified date and performance, then after a scheduled time of day, the next 3 Any Order winner is paid the sum of the actual amount in the all of the pools, including any positive amount in the Minimum Fund pool, and no more bets will be accepted.

What is claimed is:

1. A system for parimutuel wagering on actual past events, said system comprising:

a video server comprising a database having video images of gaming events stored therein;

a game server comprising a computer system; and a plurality of terminals, said video server and plurality of terminals communicatably coupled to said game server.

2. A system in accordance with claim 1 wherein said video server and said plurality of terminals communicatably coupled to said game server through a gateway to said game server.

3. A system in accordance with claim 2 further comprising a high speed local area network, said video server, said plurality of terminals, and said gateway to said game server connected to said local area network.

4. A system in accordance with claim 2 further comprising a wide area network communicatably coupling said gateway to said game server.

5. A system in accordance with claim 3 wherein said plurality of terminals comprise at least one game terminal and at least one administrative terminal.

6. A system in accordance with claim 5 wherein each said game terminal comprises:

a user interface comprising a touch activated, color display;

a cash acceptor;

a printer;

a document reader;

a sound card; and a credit/debit card reader.

7. A system in accordance with claim 6 wherein each said cash acceptor comprises a coin acceptor, a bill acceptor, or both a coin acceptor and a bill acceptor.

8. A system in accordance with claim 6 wherein said game terminal further comprises a coin dispenser.

9. A system in accordance with claim 6 wherein said system is configured to:

receive money from a player through said game terminal to establish a credit balance;

display a game selection menu on said game terminal;

receive player game selection input through said game terminal;

display a winner selection menu and historical racing data on said game terminal;

receive player winner selections and game start input through said game terminal;

display video of an historical race on said game terminal;

display race results and player winner selection comparison on said game terminal; and determine if player won and display message on said game terminal.

10. A system in accordance with claim 9 wherein said system is further configured to payout winnings if player won or debit credit balance if player lost.

11. A system in accordance with claim 10 wherein said system is further configured to print a credit voucher.

12. A system in accordance with claim 11 wherein said system is further configured to accept said credit voucher to establish a credit balance.

13. A system in accordance with claim 1 wherein said computer system comprises a plurality of databases, said computer system configured to maintain said plurality of databases.

14. A system in accordance with claim 13 wherein said computer system is configured to:

control and account for transactions with said game terminals;

control the flow of data from said video server to said game terminals;

collate wager pools;

compute winnings; and provide statistics about disbursements of funds.

15. A system in accordance with claim 13 wherein said plurality of databases comprises a game profile and control database, a liability database, a video access database, a skill database, and a network profile and control database.

16. A system in accordance with claim 15 wherein said game profile and control database comprises data indicative of games in use and status of said games.

17. A system in accordance with claim 16 wherein said game profile and control database comprises:

data defining game attributes indicative of number of selections in a wager, number of winning positions to consider, and methods of matching winning positions to wager selections;

data relating to variations in rules for each game indicative of percentage of sales allocated to tiers of major and minor progressive wager pools, commissions of a basic wager, minimum payout levels, pattern of repeated wins required to qualify for a major progressive wager pool, which subset of said video library is subject of a wager, and which type of skill data is presented to a player before a wager;

data defining each game indicative of each instance of a game upon which wagers can be placed, game rule selection, wagering status, and amounts in said minor and major progressive wager pools; and data defining a group of carrousels in a geographic or demographic region.

18. A system in accordance with claim 15 wherein said liability database comprises:

data indicative of commissions and taxes to be removed from wager pools before determination of progressive betting pool allotments;

data indicative of distributions to the racing industry or other game related interest groups;

data indicative of amount of payments to each winning player and a history of said payments;

data indicative of price round-off not returned to said wager pools;

data indicative of minimum payout levels; and data indicative of amounts carried over for the progressive wager pools of each game.

19. A system in accordance with claim 15 wherein said video access database comprises a catalogue of a video image library stored in said video server.

20. A system in accordance with claim 15 wherein said skill database comprises skill data associated with each video image stored in said video server.

21. A system in accordance with claim 15 wherein said network profile and control database comprises data indicative of a communication network.

22. A system in accordance with claim 21 wherein said communication network comprises a hierarchy of nodes, said hierarchy of nodes comprise said game server, communication concentrators, said game terminals, said administrative terminals, and said video server.

23. A system in accordance with claim 22 wherein said hierarchy of nodes further comprises a tote system interface.

24. A system in accordance with claim 13 wherein said computer system is further configured to:

receive input from said at least one administrative terminal; and upgrade and configure selected game terminals.

25. A system in accordance with claim 24 wherein said computer system is further configured to:

maintain a database of available terminal configurations;

maintain the current version of terminal software; and select a version of terminal software for downloading to said game terminal.

26. A system in accordance with claim 24 further comprising a gateway to a racetrack tote system, and said computer system further configured to reconfigure a selected game terminal to become a self-service racetrack terminal.

27. A system in accordance with claim 25 wherein said gateway is configured to communicate with a racetrack tote system.

28. A system in accordance with claim 1 wherein said video server is configured to:

maintain a database of video images; and provide on request, the delivery of video clips from said database of video images.

29. A method for parimutuel wagering on actual past events, said method comprising the steps of:

accessing a system for parimutuel wagering on actual past events, the system comprising a video server, a game server, a gateway to the game server, a plurality of terminals, and a high speed local area network, the video server, the gateway to the game server, and the plurality of terminals communicatably coupled to the local area network, the video server comprising a database having video images of gaming events stored therein, the game server communicatably coupled to the gateway, and comprising a computer system, the plurality of terminals comprising at least one game terminal and at least one administrative terminal;

receiving money from a player through a game terminal to establish a credit balance;

displaying a game selection menu on the game terminal;

receiving player game selection input through the game terminal;

displaying a winner selection menu and historical racing data on the game terminal;

receiving player winner selections and game start input through the game terminal;

displaying video of an historical race on the terminal;

displaying race results and player winner selection comparison on said the terminal; and determining if player won and displaying message on the game terminal.

30. A method in accordance with claim 29 wherein displaying a game selection menu on the game terminal comprises the step of displaying a game selection menu on a game terminal comprising a cash acceptor, a printer, a document reader, a sound card, a credit/debit card reader, and a user interface comprising a touch activated, color display.

31. A method in accordance with claim 30 wherein each cash acceptor comprises a coin acceptor, a bill acceptor, or both a coin acceptor and a bill acceptor.

32. A method in accordance with claim 30 wherein the game terminal further comprises a coin dispenser.

33. A method in accordance with claim 29 wherein the computer system comprises a plurality of databases, the computer system configured to maintain the plurality of databases.

34. A method in accordance with claim 33 wherein the computer system is configured to:

control and account for transactions with the game terminals;

control the flow of data from said video server to the game terminals;

collate wager pools;

compute winnings; and provide statistics from disbursements of funds.

35. A method in accordance with claim 33 wherein the plurality of databases comprises a game profile and control database, a liability database, a video access database, a skill database, and a network profile and control database.

36. A method in accordance with claim 35 wherein the game profile and control database comprises data indicative of games in use and status of the games.

37. A method in accordance with claim 36 wherein the game profile and control database comprises:

data defining game rules indicative of number of selections in a wager, number of winning positions to consider, and methods of matching winning positions to wager selections;

data relating to variations in rules for each game indicative of percentage of sales allocated to tiers of major and minor progressive wager pools, commissions of a basic wager, minimum payout levels, pattern of repeated wins required to qualify for a major progressive wager pool, which subset of the video library is subject of a wager, and which type of skill data is presented to a player before a wager;

data defining each game indicative of each instance of a game upon which wagers can be placed, game rule selection, wagering status, and amounts in said minor and major progressive wager pools; and data defining a group of carrousels in a geographic or demographic region.

38. A method in accordance with claim 35 wherein the liability database comprises:

data indicative of commissions and taxes to be removed from wager pools before determination of progressive betting pool allotments;

data indicative of distributions to the racing industry or other game related interest groups;

data indicative of amount of payments to each winning player and a history of the payments;

data indicative of price round-off not returned to the wager pools;

data indicative of minimum payout levels; and data indicative of amounts carried over for the progressive wager pools of each game.

39. A method in accordance with claim 35 wherein the video access database comprises a catalogue of a video image library stored in said video server.

40. A method in accordance with claim 35 wherein the skill database comprises skill data associated with each video image stored in said video server.

41. A method in accordance with claim 35 wherein the network profile and control database comprises data indicative of a communication network.

42. A method in accordance with claim 41 wherein the communication network comprises a hierarchy of nodes, the hierarchy of nodes comprise the game server, communication concentrators, the game terminals, the administrative terminals, the video server, and a tote system interface.

43. A method in accordance with claim 33 wherein the computer system is further configured to:

receive input from the at least one administrative terminal; and upgrade and configure selected game terminals.

44. A method in accordance with claim 43 wherein the computer system is further configured to:

maintain a database of available terminal configurations;

maintain the current version of terminal software; and select a version of terminal software for downloading to the game terminal.

45. A method in accordance with claim 43 further comprising a gateway to a racetrack tote system, and the computer system further configured to reconfigure a selected game terminal to become a self-service racetrack terminal.

46. A method in accordance with claim 45 wherein the gateway is configured to communicate with a racetrack tote system.

47. A method in accordance with claim 29 wherein the video server is configured to:

maintain a database of video images; and provide on request, the delivery of video clips from an historical database.

48. A game server for a parimutuel wagering system, the parimutuel wagering system comprising a video server comprising a database having video images of gaming events stored therein, at least one game terminal, at least one administrative terminal, and a high speed local area network connecting the video server and the game and administrative terminals, said game server configured to connect to the high speed local area network through a gateway to the game server, said game server comprising a computer system configured to:

control and account for transactions with the game terminals;

control the flow of data from the video server to the game terminals;

collate wager pools;

compute winnings; and provide statistics about disbursements of funds.

49. A game server in accordance with claim 48 wherein said computer system comprises a plurality of databases, said computer system configured to maintain said plurality of databases.

50. A game server in accordance with claim 49 wherein said plurality of databases comprises a game profile and control database, a liability database, a video access database, a skill database, and a network profile and control database.

51. A game server in accordance with claim 50 wherein said game profile and control database comprises data indicative of games in use and status of said games.

52. A game server in accordance with claim 51 wherein said game profile and control database comprises:

data defining game rules indicative of number of selections in a wager, number of winning positions to consider, and methods of matching winning positions to wager selections;

data relating to variations in rules for each game indicative of percentage of sales allocated to tiers of major and minor progressive wager pools, commissions of a basic wager, minimum payout levels, pattern of repeated wins required to qualify for a major progressive wager pool, which subset of the video library is subject of a wager, and which type of skill data is presented to a player before a wager;

data defining each game indicative of each instance of a game upon which wagers can be placed, game rule selection, wagering status, and amounts in said minor and major progressive wager pools; and data defining a group of carrousels in a geographic or demographic region.

53. A game server in accordance with claim 50 wherein said liability database comprises:

data indicative of commissions and taxes to be removed from wager pools before determination of progressive betting pool allotments;

data indicative of distributions to the racing industry or other game related interest groups;

data indicative of amount of payments to each winning player and a history of payments;

data indicative of price round-off not returned to the wager pools;

data indicative of minimum payout levels; and data indicative of amounts carried over for the progressive wager pools of each game.

54. A game server in accordance with claim 50 wherein said video access database comprises a catalogue of a video image library stored in said video server.

55. A game server in accordance with claim 50 wherein said skill database comprises skill data associated with each video image stored in said video server.

56. A game server in accordance with claim 50 wherein said network profile and control database comprises data indicative of a communication network.

57. A game server in accordance with claim 56 wherein said communication network comprises a hierarchy of nodes, said hierarchy of nodes comprise said game server, communication concentrators, the game terminals, the administrative terminals, and the video server.

58. A system in accordance with claim 57 wherein said hierarchy of nodes further comprises a tote system interface.

59. A game server in accordance with claim 48 wherein said computer system is further configured to:

receive input from at least one administrative terminal; and upgrade and configure selected game terminals.

60. A game server in accordance with claim 59 wherein said computer system is further configured to:

maintain a database of available terminal configurations;

maintain the current version of terminal software; and select a version of terminal software for downloading to the game terminal.

61. A method for conducting a parimutuel wagering game based on actual past events, said method comprising the steps of:

receiving money from a player to establish a credit balance;

randomly selecting an historical gaming event;

receiving player winner selections; and determining payout to player based on results of historical gaming event and player selections.

62. A method in accordance with claim 61 further comprising the steps of:

providing the player a selection of games; and receiving player game selection input.

63. A method in accordance with claim 62 further comprising the steps of:

displaying a winner selection menu and historical racing data; and receiving player winner selections and game start input.

64. A method in accordance with claim 63 further comprising the steps of:

displaying video of the historical gaming event;

displaying race results and player winner selection comparison; and determining if player won and displaying message.

65. A method in accordance with claim 64 wherein displaying video of the historical event occurs substantially immediately after receiving player winner selections and game start input.

66. A method in accordance with claim 64 wherein displaying video of the historical event occurs on a periodic schedule.

67. A method in accordance with claim 61 further comprising the step of paying out winnings if player won or debiting credit balance if player lost.

68. A method in accordance with claim 67 further comprising the step of printing a credit voucher.

69. A method in accordance with claim 61 wherein the parimutuel wagering game is conducted in an on demand mode.

70. A method in accordance with claim 61 wherein the parimutuel wagering game is conducted in a periodic mode.

71. A video server for a parimutuel wagering system, the parimutuel wagering system comprising a game server comprising a computer system, a gateway to the game server, at least one game terminal, at least one administrative terminal, and a high speed local area network connecting the gateway to the game server, the game terminals, and the administrative terminals, said video server comprising:

at least one disk storage module; and a database having video images of gaming events stored therein;

said video server configured to:

maintain said database of video images; and provide on request, the delivery of video clips from said database of video images to the game terminals of the parimutuel wagering system.

* * * * *